United States Patent [19]

Risbeck et al.

[11] 4,441,012
[45] Apr. 3, 1984

[54] METHOD AND APPARATUS FOR CONTROLLING HEATING POWER DURING THE APPLICATION OF MOLTEN FILLER MATERIAL TO A WORKPIECE

[75] Inventors: James D. Risbeck; Ernest B. Cooper, both of Cincinnati, Ohio

[73] Assignee: General Electric Company, Cincinnati, Ohio

[21] Appl. No.: 330,116

[22] Filed: Dec. 14, 1981

[51] Int. Cl.³ .............................................. B23K 9/09
[52] U.S. Cl. .......................... 219/137 R; 219/130.51; 219/137.71
[58] Field of Search ...................... 219/137.71, 130.51, 219/75, 137 R

[56] References Cited

U.S. PATENT DOCUMENTS

| | | |
|---|---|---|
| 2,093,881 | 9/1937 | Conrad . |
| 2,340,093 | 1/1944 | White . |
| 2,505,054 | 4/1950 | McElrath, Jr. et al. . |
| 2,636,102 | 4/1953 | Lobosco . |
| 2,723,331 | 11/1955 | Tyrner . |
| 2,731,536 | 1/1956 | Laur . |
| 2,778,099 | 1/1957 | Anderson et al. ..................... 29/484 |
| 2,806,127 | 9/1957 | Hackman et al. ............... 219/137 R |
| 3,581,053 | 5/1971 | Manz ................................ 219/137 R |
| 3,584,185 | 6/1971 | Mann et al. .................... 219/130.51 |
| 3,627,977 | 12/1971 | Aldenhoff . |
| 3,731,049 | 5/1973 | Kiyohara et al. . |
| 3,737,614 | 6/1973 | Paulange ........................ 219/137.71 |
| 3,934,110 | 1/1976 | Denis . |
| 3,940,586 | 2/1976 | Stearns et al. ......................... 219/75 |
| 3,956,610 | 5/1976 | Kanbe et al. ................... 219/130.51 |
| 4,159,410 | 6/1979 | Cooper .............................. 219/137.7 |
| 4,249,062 | 2/1981 | Hozumi et al. ................. 219/124.34 |

FOREIGN PATENT DOCUMENTS

| | | |
|---|---|---|
| 627795 | 7/1963 | Belgium ...................... 219/137 R X |
| 674680 | 6/1952 | United Kingdom . |
| 996126 | 6/1965 | United Kingdom . |
| 1133093 | 11/1965 | United Kingdom . |
| 1189182 | 4/1970 | United Kingdom . |
| 1245807 | 9/1971 | United Kingdom . |
| 1332059 | 8/1973 | United Kingdom . |

OTHER PUBLICATIONS

A. M. Naidenov, Mechanical Control of the Transfer of Electrode Metal, Avt. Svarka, 1969, No. 12, pp. 31-33.

Primary Examiner—C. C. Shaw
Attorney, Agent, or Firm—Lee H. Sachs; Derek P. Lawrence

[57] ABSTRACT

A method and apparatus for applying filler material to a workpiece in conjunction with a heat producing means, to deposit a heating/molten pool region on the workpiece; wherein the filler wire is introduced into the pool region in a reciprocating manner which alternately advances an end of the filler wire into and out of the pool region; and wherein the heat produced by the heat producing means is varied so that peak heating pulses are initiated and maintained when the filler wire contacts the pool region, and so that the heat producing means maintains a lower, background level when the filler wire is withdrawn from the pool region.

19 Claims, 6 Drawing Figures

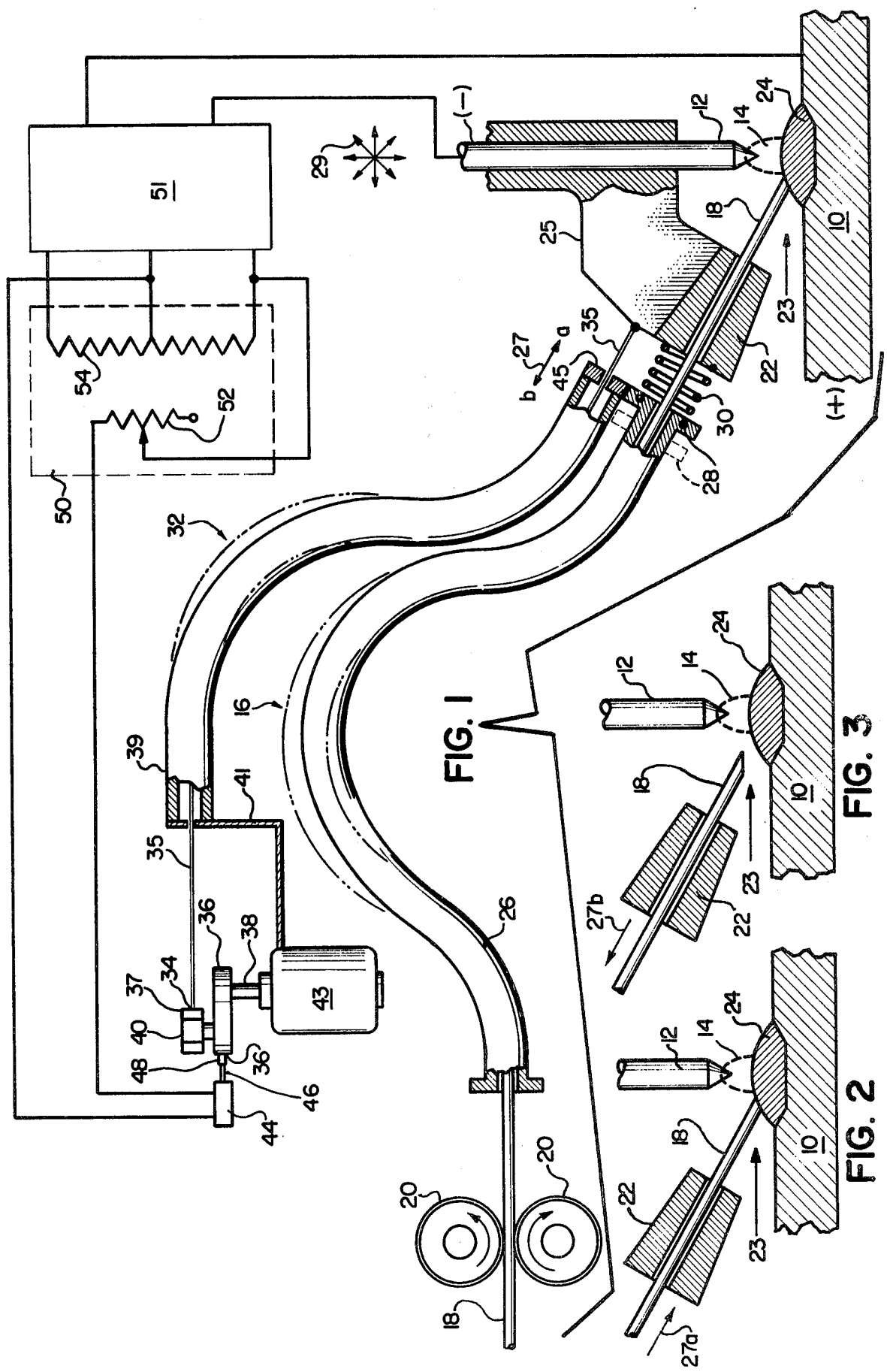

METHOD AND APPARATUS FOR CONTROLLING HEATING POWER DURING THE APPLICATION OF MOLTEN FILLER MATERIAL TO A WORKPIECE

FIELD OF THE INVENTION

The present invention relates generally to welding and repair welding and, more particularly, to an improved method and apparatus for controlling the welding process which is used to establish a pool of filler material for deposit and subsequent application to a surface of a workpiece.

BACKGROUND OF THE INVENTION

In the semi-automatic welding and repair welding of articles such as gas turbine engine alloy components and the like, it is a general practice to add filler material in the form of a metal wire, ribbon, etc., which is introduced into a molten weld puddle or pool by an appropriate apparatus. Of course, as used herein, the term "wire" is intended to include other equivalent material forms as well. Relative motion is provided between the surface of the workpiece and the molten pool of filler material to provide a complete welding or repairing operation.

The molten weld puddle or pool may be formed using a variety of different heat producing devices. For example, an electric arc generated between an electrode and a work surface of the workpiece, a plasma arc, a laser, or other such heat producing means may be used to provide this pool.

A variety of different devices have been developed which are capable of performing the foregoing operation. Of particular interest is the method and apparatus disclosed in U.S. Pat. No. 4,159,410, issued to Cooper and assigned to the assignee of the present application. U.S. Pat. No. 4,159,410 illustrates a method and apparatus for applying a filler material to a workpiece in which a filler material or wire is selectively introduced into a heating/molten pool area which is formed on the workpiece in a reciprocating manner; intermittently introducing the wire into the region and withdrawing the wire from the region at a specified feed rate. In this manner, melting of the end of the wire occurs intermittently, providing various stated benefits. Application of the filler material to the workpiece proceeds on a continuous basis in this manner, as described in U.S. Pat. No. 4,159,410, the subject matter of which is incorporated by reference as if fully set forth herein.

Although the method and apparatus disclosed in U.S. Pat. No. 4,159,410 significantly improves the quality of the weld or repair weld which is produced, it has been found that this method and apparatus is capable of still further improvement. For instance, in using the foregoing apparatus, as well as other previously available devices, undesirable melting of the workpiece, and sometimes premature melting of the end of the filler wire, has been found to occur. In an effort to remedy these situations, a variety of different approaches have been developed, none of which have satisfactorily eliminated these problems. For example, U.S. Pat. No. 3,581,053, issued to Manze, discloses a technique which synchronizes weld current applied to a heating torch with feeding of the filler wire in a manner which produces a maximum current when the wire is farthest from the workpiece, and a minimum current when the wire is in contact with the workpiece. In this manner, a globule is formed on the feed wire at its maximum excursion, which globule is then detached from the feed wire by surface tension upon contact with the workpiece. A similar technique is disclosed in U.S. Pat. No. 3,934,110, issued to Dennis.

U.S. Pat. No. 3,627,977, issued to Aldenhoff, discloses a technique which initiates operation of the welding apparatus as the filler material contacts the surface of the workpiece, primarily as a safety feature to protect the operator of the apparatus. However, operation of the welding apparatus is not discontinued until after the entire welding operation is completed, and no program is developed for selectively discontinuing the application of current to the welding device in response to reciprocation of the filler material.

Accordingly, it may be seen that workers in this art have developed a variety of different techniques to regulate melting of the filler wire as it is applied onto the surface of the workpiece. However, none of the techniques developed to date have provided a method which satisfactorily assures proper melting of the workpiece and the filler wire in conjunction with an apparatus which makes use of a reciprocating wire feed action to form the weld puddle or pool.

SUMMARY OF THE INVENTION

It is therefore a principal object of the present invention to provide an improved method and apparatus for applying filler material to a workpiece.

Another object of the present invention is to provide an improved method and apparatus for applying filler material to a workpiece using a reciprocating filler wire feed action.

A further object of the present invention is to provide an improved method and apparatus for applying filler material to a workpiece using a reciprocating filler wire feed action, which effectively regulates formation of the puddle or pool of molten filler material during application of the filler material to the workpiece.

These and other objects and advantages will be more fully understood from the following detailed description, examples and drawings, which are all intended to typify, rather than in any way limit, the scope of the present invention.

Briefly, a method and apparatus is provided for applying a filler material, such as a filler wire, to a workpiece by melting an end of the wire in a heat producing means for deposit onto the workpiece. To produce an appropriate weld pool, the wire is selectively introduced into the pool region in a reciprocating manner which alternately introduces the wire into the weld pool and withdraws the wire from the weld pool at a specified feed rate. By providing appropriate movement of the workpiece during application of the melted filler material, the resulting molten pool is appropriately applied to the surface of the workpiece, providing the desired weld or repair weld.

In accordance with the present invention, application of heat to the system to melt the filler material is synchronized with the introduction of the filler wire into the weld pool, and the withdrawal of the filler wire from the weld pool, as follows. An electrically operated heat producing means is provided in which the heating power, such as welding current or laser energy, is pulsed between preselected peak and background levels. This pulsing of the heating power proceeds in a manner which initiates peak heating power pulses as the filler wire contacts the molten pool produced by the heat producing means. The peak heating power pulses are maintained until the filler wire is withdrawn from the molten pool, at which time the heating power pulses are reduced to the lower, background level. The frequency of the heating power pulses, as well as their peak to background time and level, may be varied in accordance with the indicated rate of wire feed for a particular application, which primarily depends upon the volume of melted wire required for proper filler material application, as well as the thermal energy distribution characteristics of both the base weldment and the filler addition.

The present technique is applicable for use in conjunction with pulsed wire feed additions which proceed either by a constant feed of wire into the device with a superimposed reciprocating motion to selectively introduce the wire into the pool, or by intermittently feeding the wire into the weld pool as required. In either case, by delaying peak heating power pulse initiation until the filler wire is introduced into the molten pool, premature melting of the filler wire is precluded. Further, molten puddle or pool size is regulated.

BRIEF DESCRIPTION OF THE DRAWINGS

FIG. 1 is a partial, cross-sectional, diagrammatic view of a preferred embodiment welding/repair welding apparatus which incorporates the welding power control means of the present invention.

FIGS. 2 and 3 are fragmentary, diagrammatic views illustrating alternate positions of the filler wire with respect to the molten weld pool region deposited on the workpiece.

In the several views provided, like reference numerals denote similar structure.

DESCRIPTION OF THE PREFERRED EMBODIMENT

Figure 6:
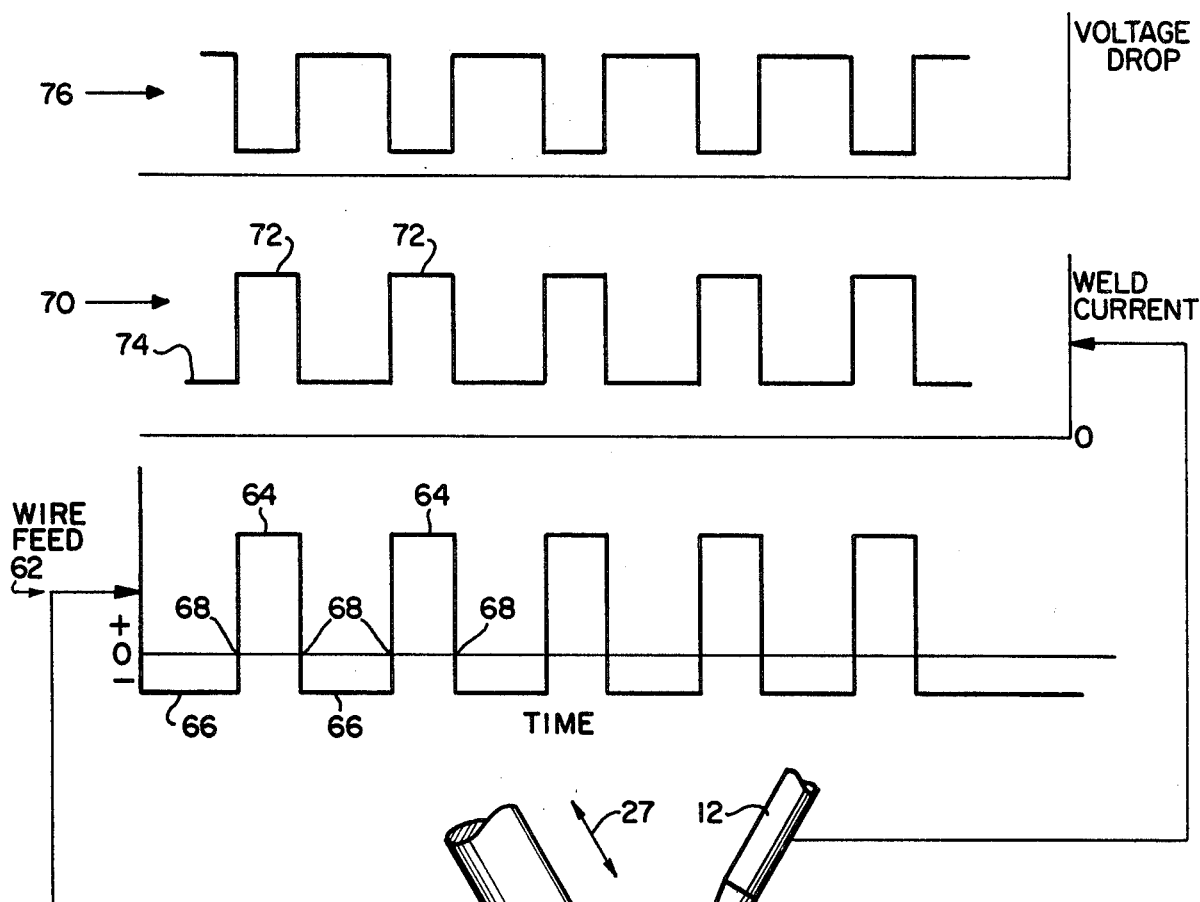
FIG. 6 is a diagrammatic view illustrating the timing sequence developed by the welding power control means of the present invention.

Although specific forms of the invention have been selected for illustration in the drawings, and the following description is drawn in specific terms to describe these forms of the invention, this description is not intended to limit the scope of the invention which is defined in the appending claims.

FIG. 1 shows an illustrative embodiment of an apparatus which can be used to provide a weld/repair weld operation in conjunction with a workpiece 10. Clearly, workpiece 10 can be any of a variety of different articles on which such an operation is to be performed. Further, the embodiment of the apparatus illustrated in the figures is merely illustrative, it being understood that the method and apparatus of the present invention can be used in conjunction with a variety of different devices.

As shown, the workpiece 10 forms a positive electrode (designed as "+") which cooperates with a negative electrode 12 (designated as "−") to provide the appropriate weld conditions. Electrode 12 is preferably a non-consumable type, although consumable electrodes may also be used. The workpiece 10 and electrode 12 cause an electric arc 14 to be developed using a welding current control 50 and an appropriate welding current generator 51 of the type commonly available in this art. It should also be understood that plasma-type welding devices as well as welding devices using a laser can be used to provide the necessary heat if desired.

Associated with the welding device is a filler wire feed means or assembly, designated generally as 16, which delivers a filler wire 18 from a source (not shown), through the motor driven feed rolls 20, the flexible conduit 26, and the feed nozzle 22, for subsequent advancement into the weld pool 24 produced on the workpiece 10 as a result of use of a heat producing means, such as the electric arc 14 generated between the workpiece 10 and the electrode 12. In this manner, a heating/molten pool region is developed at 23 which is capable of producing the weld or repair weld desired.

A variety of different devices may be used to provide respective reciprocation between the filler wire 18 and the weld pool region 23. In the apparatus illustrated in FIG. 1, a feed nozzle 22 is fixedly associated with the electrode 12 by the fixture 25, thereby providing proper respective orientation between the electrode 12 and the feed nozzle 22 so that the filler wire 18 is properly introduced into the weld pool 24. To provide a reciprocating motion, a reciprocating cable assembly 32 is attached to the flexible conduit 26. The end 34 of the flexible cable 35 of the assembly 32 is provided with an eccentric drive means which provides for reciprocating movement of the assembly 32 in an alternating motion illustrated by the arrow 27. Accordingly, movement of the end 28 of the assembly 26 proceeds between the position illustrated in solid lines and the position illustrated in phantom, providing intermittent advancement of the filler wire 18 into the nozzle 22, and in turn, into the weld pool 24. The reciprocating movement of the assemblies 16 and 32 may be assisted by the spring 30, if desired.

The eccentric drive means includes a cam 36 which is eccentrically mounted for rotation about a shaft 38, a pin 40 which forms part of the cam 36, and a bearing 37 mounted to the cam 36 by the pin 40. The flexible cable 35 is attached to the bearing 37 and to the wire guide mount support 25. The casing 39 of the cable 35 is attached to a motor 43 by the bracket 41, and is attached to the end 28 of the conduit 26 by a clamping assembly 45. From the foregoing, it may be seen that rotation of the eccentric cam 36 about the shaft 38 will cause intermittent advancement of the end 28 of the assembly 32 toward and away from the feed nozzle 22. Clearly, the speed and stroke of this advancement and retraction may be varied by appropriately altering the configuration of the cam 36 and the rotational speed of the motor 43 which rotates the shaft 38.

As illustrated in FIG. 1, a switch 44 is also operatively associated with the cam 36. As will be more fully described below, the switch 44 is used to control operation of the welding current generator 51, thereby coordinating operation of the electrode 12 with the advancement of filler wire 18 into the weld pool 24. The microswitch 44 illustrated comprises a pivot arm 46 and associated follower 48, which are capable of tracking the cam 36 during its rotation. Clearly, a variety of different switches may be used to perform this function, the microswitch 44 serving as an illustrative example only.

Operation of the foregoing to provide a weld or repair weld proceeds as follows. In FIG. 1, the cam 36 is oriented so that the pin 40 is in its rearmost position. In this orientation, the cable casing 39 is compressed, advancing the end 28 which advances the filler wire 18 in the direction of the arrow 27a illustrated in FIG. 2. This position corresponds to full advancement of the filler wire 18 into the weld pool 24. Further rotation of the cam 36 causes the broadest portion of the cam 36, and the pin 40, to rotate, which relaxes the cable casing 39 and causes the end 28 to be retracted in the direction of the arrow 27b illustrated in FIG. 3. This in turn withdraws the filler wire 18 from the weld pool 24, thereby completing a material depositing cycle.

As previously discussed, the weld conditions are dependent upon the rate at which filler wire is melted to provide a proper weld pool 24, as well as upon the thermal energy distribution characteristics of both the base weldment and the filler addition. These weld conditions are advantageously regulated in accordance the present invention by causing the initiation, and duration, of peak heating power pulses which are applied to the electrode 12 to correspond to contact between the filler wire 18 and the molten pool 24.

Figure 4:
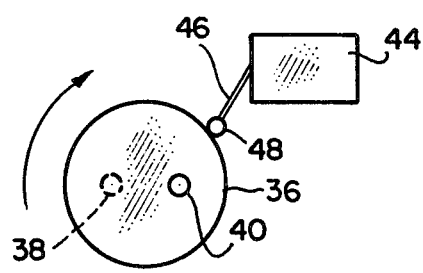
FIGS. 4 and 5 are diagrammatic views illustrating alternate positions of the welding power control switch in relation to the filler wire positions illustrated in FIGS. 2 and 3, respectively.

To do so, the switch 44 which is operatively associated with the cam 36 is positioned so that the follower 48 responds to changes in eccentricity of the cam 36. In this manner, the relative positioning of the end 28 of the assembly 32, and accordingly, advancement of the filler wire 18 into the weld pool 24, is synchronized to the relationship between the switch 44 and the cam 36. For example, as illustrated in FIG. 4, when the cam 36 assumes the orientation shown in FIG. 1, the arm 46 of the switch 44 is compressed. By properly positioning the switch 44 with respect to the cam 36, contact changes of the switch 44 by compression of the arm 46 can be synchronized with the introduction of filler wire 18 into the weld pool 24. Closure of the switch 44 may then be used to produce a signal for regulating operation of the welding current generator 51 using a variety of different switching functions.

One way in which this may be accomplished is to vary the resistance in the welding current control 50 of the welding current generator 51 in response to contact changes at switch 44. As shown in FIGS. 1 and 4, the arm 46 of the switch 44 is compressed, triggering the switch 44 to open its contacts, which are normally closed. Opening of the contacts of the switch 44 removes a shunt resistance 52 from a primary resistance 54, thereby effecting a change in the control 50 of the welding current generator 51, which increases the weld current delivered to the electrode 12.

Figure 5:
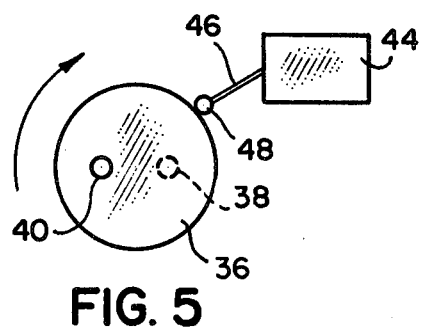

As illustrated in FIG. 5, as rotation of the cam 36 progresses, the arm 46 is permitted to relax, eventually allowing the contacts of the switch 44 to return to their normally closed position, thereby returning the shunt resistance 52 across the primary resistance 54. The corresponding change in resistance in the control 50 of the welding current generator 51 serves to reduce the welding current to its original background level. Again, this decrease in weld current is synchronized with the withdrawal of the filler wire 18 from the weld pool 24 by properly positioning the switch 44 with respect to the cam 36.

In this manner, the welding current generator 51 is switched from a peak current level, when the switch 44 is activated, to a background current level when the switch 44 is relaxed; the resulting current pulse being synchronized with contact between the filler wire 18 and the weld pool 24. Of course, the timing function developed may be varied as needed by altering the relative positioning between the switch 44 and the cam 36.

It has generally been found that reciprocation of the feed wire 18 should proceed at a rate of approximately 2 to 30 strokes per second (one stroke being the forward and backward movement) to obtain optimum conditions. Generally, this will result in pulse frequencies which typically vary from 2 to 30 hertz. In addition to pulse frequency variation, pulse duration may also be varied to suit a particular application, and these timing parameters may be varied as needed. In addition, the background-to-peak current ratio which is produced as the switch 44 is intermittently operated may be varied, preferably in a range of from at least 1:2 up to 1:13. Irrespective of the parameters selected, the foregoing apparatus serves well to satisfy each of the objectives previously set forth.

FIG. 6 provides a schematic representation of the relationship between filler wire advancement and weld current pulsing previously described. As shown, a filler wire 18 is advanced from the nozzle 22 in a reciprocating motion represented by the arrow 58, while operation of the electrode 12 forms the weld pool 24 which is used to apply the deposit 60 to the work surface 10 as shown.

The curve 62 represents filler wire advancement; the portions 64 representing complete forward advancement of the assembly 32, as illustrated in FIGS. 1 and 2; the portions 66 representing complete rearward withdrawal of the assembly 32, as illustrated in FIG. 3. Each zero crossing 68 represents the point of contact between the filler wire 18 and the weld pool 24.

The curve 70 represents the corresponding weld current which is produced by the welding current generator 51 in relation to the filler wire positioning represented by the curve 62. It may be seen that the peak current pulses 72 correspond to insertion of the filler wire 18 into the weld pool 24, and that the background current level 74 corresponds to withdrawal of the filler wire 18 from the weld pool 24, providing the synchronous current pulses desired.

Referring to the curve 76, it may be seen that contact between the filler wire 18 and the weld pool 24 may be detected in accordance with a voltage drop, generally approaching zero, developed between the filler wire 18 and the workpiece 10. Accordingly, monitoring variations in the voltage between the filler wire and the base weldment may be used to empirically determine the timing of the peak current pulses, for example, from oscillograph/oscilloscope tracings of the voltage developed between the filler wire 18 and base weldment. This provides a control feature which facilitates ready determination of the operational parameters for a particular application.

Synchronous pulsing of the current applied to the electrode and the addition of filler material to the system in accordance with the present invention has been found to produce a variety of advantages. For example, the relatively large molten reception zones developed in prior devices are no longer required for proper filler addition melting. Rather, thermal energy from the heat producing means is rapidly injected into the fusion zone, which in turn assures that a higher percentage of injected energy is used for melting of the filler material, minimizing the remainder of energy which is distributed to the workpiece. In this manner, the deleterious effects of such energy distribution, such as annealing or overaging in precipitation hardening alloys, liquation of low melting point grain boundary eutectics, and strain age cracking in certain nickel alloys during subsequent heat treatments are substantially eliminated. Moreover, control of the depth of workpiece penetration is improved.

It will therefore be understood that various changes in the details, materials and arrangements of parts which have been herein described and illustrated in order to explain the nature of this invention may be made by those skilled in the art within the principle and scope of the invention as expressed in the following claims.

What is claimed is:

1. In a method for applying filler material to a workpiece in which an end of a filler wire of the filler material is melted in a heat producing means to provide a heating/molten pool region deposited on the workpiece, the improvement comprising:
   introducing the filler wire into the pool region in a reciprocating manner to alternately advance the end of the filler wire into and out of the pool region; and
   varying the heat produced by the heat producing means so that peak heating pulses are initiated when the advancing end of the filler wire contacts the pool region; and maintaining the peak heating pulses until the filler wire is withdrawn from the pool region.

2. The method of claim 1 wherein the heat produced by the heat producing means is returned to a lower, background level when the filler wire is withdrawn from the pool region.

3. The method of claim 2 wherein the ratio of the heat produced during the peak heating pulse in relation to the heat produced during the background level lies in a range of from at least 1:2 to 1:13.

4. The method of claim 1 wherein the frequency of the peak heating pulse is approximately 2-30 hertz.

5. The method of claim 1 wherein the heat producing means is electrically operated, and wherein the heat produced by the heat producing means is varied by varying the heating power applied to the heat producing means.

6. An apparatus for applying filler material to a workpiece, the apparatus including heat producing means for directing heat toward a surface of the workpiece to provide a heating/molten pool region, and filler wire feed means to feed an end of a filler wire formed of the filler material toward the pool region, the improvement comprising:
   means for introducing the filler wire into the pool region in a reciprocating manner to alternately advance the end of the filler wire into and out of the pool region; and
   means for varying the heat produced by the heat producing means so that peak heating pulses are initiated when the advancing end of the filler wire contacts the pool region and are maintained until the filler wire is withdrawn from the pool region.

7. The apparatus of claim 6 wherein the heat producing means assumes a lower, background level when the filler wire is withdrawn from the pool region.

8. The apparatus of claim 6 wherein the introducing means comprises:
   a reciprocating assembly, one end of which is operatively associated with the filler wire feed means, and the other end of which includes an eccentric drive means;
   switching means including follower means operatively associated with the eccentric drive means; and
   means for rotating the eccentric drive means, thereby causing movement of the reciprocating assembly and alternately switching the switching means between an operative and an inoperative mode.

9. The apparatus of claim 8 wherein switching of the switching means between the operative and inoperative mode is synchronized to insertion of the end of the filler wire into the pool region, and withdrawal of the end of the filler wire from the pool region, respectively.

10. The apparatus of claim 8 wherein the orientation between the switching means and the eccentric drive means is variable.

11. The apparatus of claim 8 wherein the heat producing means is electrically operated, and wherein the switching means, in the operative mode, causes the heat producing means to provide a high heating power, and in the inoperative mode, causes the heat producing means to provide a low heating power.

12. The apparatus of claim 11 wherein the heat producing means is a welding torch, the heating power is weld current, and the high and low weld currents are produced by varying a resistance applied across a welding current supply control means associated with the welding torch.

13. The apparatus of claim 11 wherein the heat producing means is a laser, the heating power is laser energy, and the high and low heating powers are produced by varying the control voltage applied to a laser power supply.

14. In a method for applying filler material to a workpiece in which an end of a filler wire of the filler material is melted in a heat producing means to provide a heating/molten pool region deposited on the workpiece, the improvement comprising:
   introducing the filler wire into the pool region in a reciprocating manner to alternately advance the end of the filler wire into and out of the pool region;
   increasing the heat produced by the heat producing means from a background level to an increased level capable of melting the filler material when the end of the filler wire being advanced into the pool region contacts the pool region; and
   decreasing the heat produced by the heat producing means from the increased level to the background level when the end of the filler wire is withdrawn from the pool region.

15. The method of claim 14 wherein said increasing and said decreasing essentially directly correlates with contact between the end of the filler wire and the pool region.

16. The method of claim 15 wherein said increasing and said decreasing essentially only correlates with contact between the end of the filler wire and the pool region.

17. An apparatus for applying filler material to a workpiece, the apparatus including heat producing means for directing heat toward a surface of the workpiece to provide a heating/molten pool region, and filler wire feed means to feed an end of a filler wire formed of the filler material toward the pool region, the improvement comprising:
   means for introducing the filler wire into the pool region in a reciprocating manner to alternately advance the end of the filler wire into and out of the pool region; and means for varying the heat produced by the heat producing means so that:

the heat produced by the heat producing means is increased from a background level to an increased level capable of melting the filler material when the introducing means brings the advancing end of the filler wire into contact with the pool region; and the heat produced by the heat producing means is decreased from the increased level to the background level when the introducing means withdraws the end of the filler wire from the pool region.

18. The apparatus of claim 17 wherein said increasing and said decreasing essentially directly correlates with contact between the end of the filler wire and the pool region.

19. The apparatus of claim 18 wherein said increasing and said decreasing essentially only correlates with contact between the end of the filler wire and the pool region.

* * * * *